United States Patent
Stack et al.

(10) Patent No.: US 7,315,485 B1
(45) Date of Patent: Jan. 1, 2008

(54) SYSTEM AND METHOD FOR TARGET CLASSIFICATION AND CLUTTER REJECTION IN LOW-RESOLUTION IMAGERY

(75) Inventors: Jason Stack, Panama City Beach, FL (US); Gerald Dobeck, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 135 days.

(21) Appl. No.: 11/326,672

(22) Filed: Dec. 20, 2005

(51) Int. Cl.
*G03B 42/06* (2006.01)
*G01S 15/89* (2006.01)

(52) U.S. Cl. .......................... 367/11; 367/88
(58) Field of Classification Search .......... 367/7, 367/11, 88, 131, 136; 382/103
See application file for complete search history.

(56) References Cited

U.S. PATENT DOCUMENTS

| | | | | |
|---|---|---|---|---|
| 4,939,698 A * | 7/1990 | Murphree | .................... | 367/88 |
| 5,018,214 A * | 5/1991 | Pasch | ......................... | 382/180 |
| 5,155,706 A * | 10/1992 | Haley et al. | .................. | 367/88 |
| 5,200,931 A * | 4/1993 | Kosalos et al. | .............. | 367/88 |
| 5,214,744 A * | 5/1993 | Schweizer et al. | ........... | 382/103 |
| 5,231,609 A * | 7/1993 | Gaer | ........................... | 367/136 |
| 5,275,354 A * | 1/1994 | Minor et al. | .............. | 244/3.17 |
| 5,321,667 A * | 6/1994 | Audi et al. | .................... | 367/88 |
| 5,438,552 A * | 8/1995 | Audi et al. | .................... | 367/88 |
| 5,555,532 A * | 9/1996 | Sacha | .......................... | 367/88 |
| 5,612,928 A * | 3/1997 | Haley et al. | .................. | 367/11 |
| 5,909,190 A * | 6/1999 | Lo et al. | ..................... | 342/159 |
| 5,937,078 A * | 8/1999 | Hyland et al. | ............. | 382/103 |
| 6,052,485 A | 4/2000 | Nelson et al. | ............. | 382/225 |
| 6,108,454 A * | 8/2000 | Nevis et al. | ............... | 382/255 |
| 6,130,641 A * | 10/2000 | Kraeutner et al. | ......... | 342/179 |
| 6,549,660 B1 * | 4/2003 | Lipson et al. | .............. | 382/224 |
| 6,754,390 B2 * | 6/2004 | Dobeck | ..................... | 382/228 |
| 7,164,618 B1 * | 1/2007 | Matthews | .................... | 367/11 |
| 7,221,621 B2 * | 5/2007 | Patterson et al. | ............ | 367/88 |
| 2002/0110279 A1 * | 8/2002 | Dobeck | ...................... | 382/228 |
| 2003/0002712 A1 * | 1/2003 | Steenburgh et al. | ....... | 382/103 |

\* cited by examiner

*Primary Examiner*—Daniel Pihulic
(74) *Attorney, Agent, or Firm*—James T. Shepherd (57) ABSTRACT

A system and method of determining a classification of at least one underwater object is provided. The method includes generating at least one low-resolution imagery of an object from a plurality of frequencies produced by a detection device and extracting at least 5 characteristics of the object within the low-resolution imagery at each of the plurality of frequencies. The method further includes generating at least 15 features from the at least 5 characteristics and classifying the features to determine the identity of the at least one underwater object.

16 Claims, 7 Drawing Sheets

$X_1$ = Height (Max pixel value) — 61

$X_2$ = Width at a first predetermined decibel — 62

$X_3$ = Depth at a first predetermined decibel — 63

$X_4$ = Width at a second predetermined decibel — 64

$X_5$ = Depth at a second predetermined decibel — 65

$X_1$ = Height (Max pixel value) — 41
$X_2$ = Width at a first predetermined decibel — 42
$X_3$ = Depth at a first predetermined decibel — 43
$X_4$ = Width at a second predetermined decibel — 44
$X_5$ = Depth at a second predetermined decibel — 45
$X_6$ = Height (Max pixel value) — 46
$X_7$ = Width at a first predetermined decibel — 47
$X_8$ = Depth at a first predetermined decibel — 48
$X_9$ = Range difference between the two returns — 49

Fig. 3
40

$X_1$ = Height (Max pixel value) — 51
$X_2$ = Width at a first predetermined decibel — 52
$X_3$ = Depth at a first predetermined decibel — 53
$X_4$ = Width at a second predetermined decibel — 54
$X_5$ = Depth at a second predetermined decibel — 55

SYSTEM AND METHOD FOR TARGET CLASSIFICATION AND CLUTTER REJECTION IN LOW-RESOLUTION IMAGERY

STATEMENT OF GOVERNMENT INTEREST

The invention described herein was made in the performance of official duties by employees of the Department of the Navy and may be manufactured, used, licensed by or for the Government for any governmental purpose without payment of any royalties thereon.

FIELD

The present teachings relate to a system and method for classifying underwater objects located in coastal regions as either targets or clutter (non-targets) using low-resolution imagery.

BACKGROUND

Typically, mines designed to be utilized in coastal regions are smaller in size compared to mines designed to be utilized in deep ocean depths. Therefore, when mining these coastal regions a larger number of smaller mines need to be deployed. One of the challenges encountered during littoral mine countermeasures (MCM) is distinguishing seafloor clutters from mines present in coastal regions. These seafloor clutters, which can range from man-made debris to rock outcrops, can also appear as having mine-like characteristics when viewed by sonar imagery. Accordingly, the ability to accurately distinguish between actual mines and seafloor clutter in sonar imagery is of utmost importance.

Figure 1:
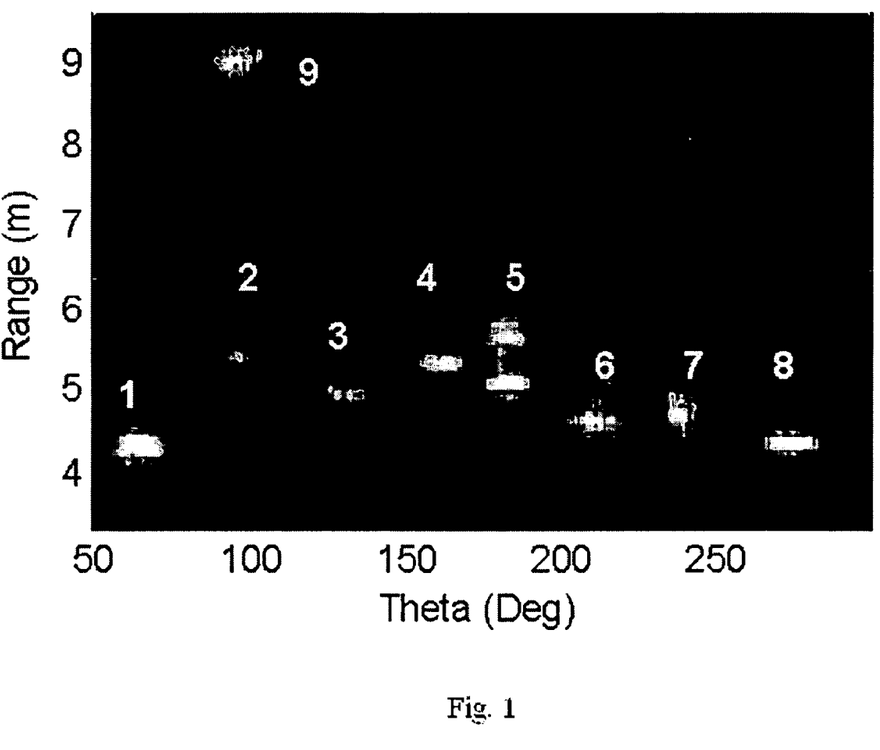
FIG. 1 is a low-resolution sonar image of nine objects.

One known method of detecting underwater objects in coastal regions is by installing sensors capable of operating at multiple narrowband frequencies on a variety of unmanned underwater vehicles (UUVs). An example of a UUV having a multiple narrow band frequency sensor is a seafloor crawler including an IMAGENEX 881A rotating head sonar. Crawling vehicles operate in close proximity to the seafloor; therefore, objects imaged by the sensor produce no acoustic shadow. Additionally, the use of low-resolution imagery results in images of objects being poorly defined or having no shape. It is often the shape and size of the object and acoustic shadow that yield some of the most salient features used by classifiers in determining whether the detected underwater object is a target or clutter. Not having produced a defined shape or acoustic shadow causes detected underwater objects to appear as bright spots on a screen. Referring to FIG. 1, the detected objects appear as bright spots on a screen with little discernable shape. As a result, it is not possible to accurately determine the class (target or non-target) of the underwater object.

There exists a need for a method and system that is capable of accurately classifying the objects detected by low-resolution sonar systems which is relatively inexpensive and easy to deploy.

SUMMARY

The present teachings disclose a system and method for determining the class of each underwater object that is detected by a sonar system operating at a plurality of frequencies.

According to the present teachings, the method includes generating at least one low-resolution imagery of an object from a plurality of frequencies produced by a detection device and extracting at least 5 characteristics of the object within the low-resolution imagery at each of the plurality of frequencies. The method further includes generating at least 15 features from the at least 5 characteristics and classifying the features of each underwater object.

The present teachings also provide a system for determining the class of each underwater object. The system includes four processors. The first processor is capable of generating at least one low-resolution imagery of an object from a plurality of frequencies produced by a detection device. The second processor is capable of extracting at least 5 characteristics of the object within the low-resolution imagery at each of the plurality of frequencies. The third processor is capable of generating at least 15 features from the at least 5 characteristics and the further processor is capable of classifying the features of each underwater object.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DESCRIPTION

Figure 2:
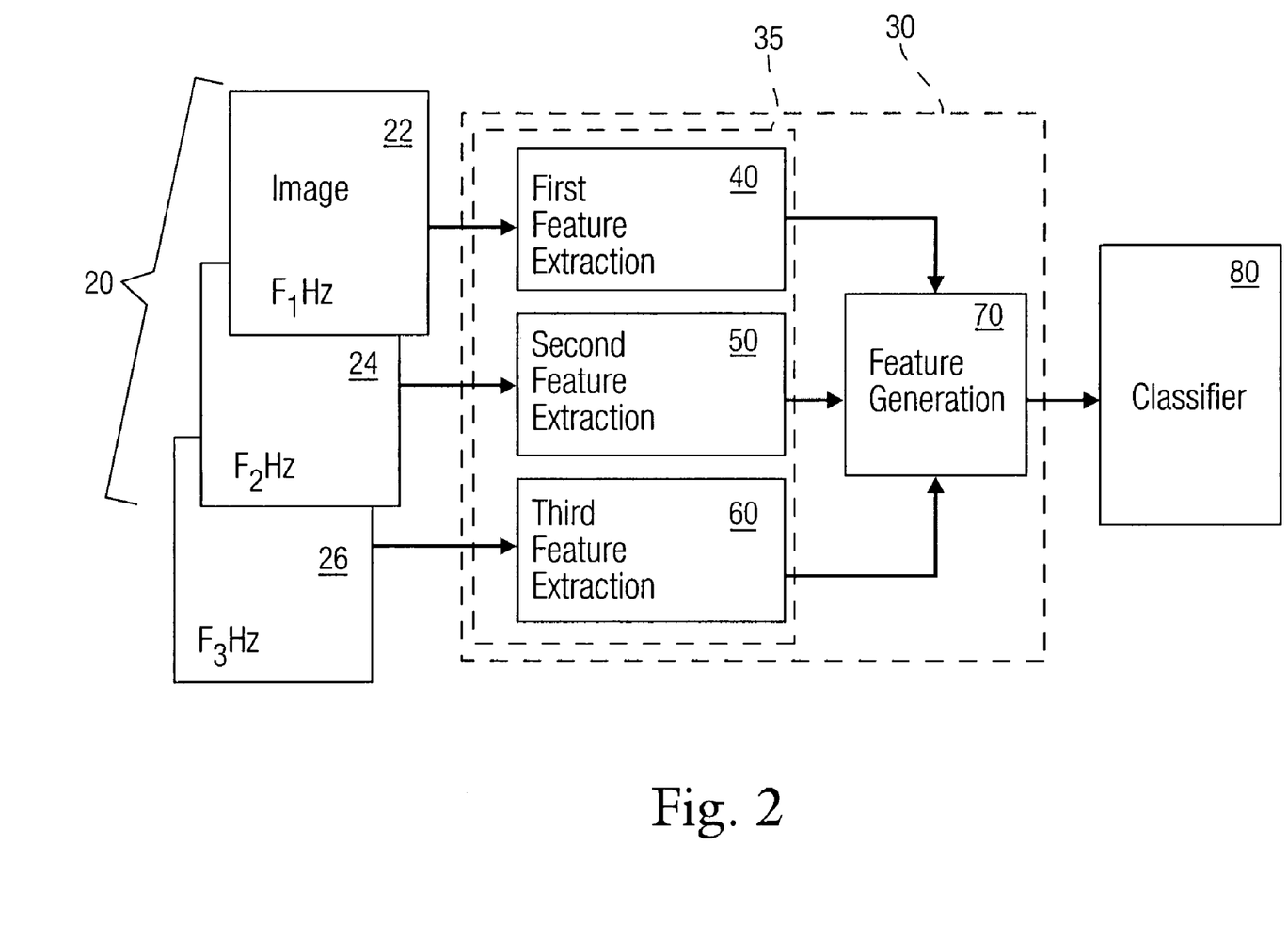
FIG. 2 shows an overview diagram of a method for determining the class of each underwater object according to various embodiments.

The present teachings are directed to a method of processing low-resolution imagery of an object in order to determine the class of each underwater object. As shown in FIG. 2, the present teachings include an input stage 20 that can include the low-resolution imagery of an object, an algorithm stage 30, and a classifier or classifying stage 80. As shown in FIG. 2, the input stage 20 (for algorithm stage 30) can include N-multiple images, such as images 22, 24, and 26, relating to a single underwater object at different frequencies, such as frequencies $f_1$, $f_2$, and $f_3$. Images 22, 24, and 26 can be obtained by any instrument, such as a narrowband sonar or radar operating at different frequencies, a broadband sonar or radar whose output is bandpass filtered to produce multiple images, or a multi-spectral electro-optic sensor. Each of the images 22, 24, and 26 corresponding to a single underwater object can be transmitted to the algorithm stage 30.

Preferably, in an exemplary embodiment, the algorithm stage 30 can include at least two steps. The first step in the algorithm stage 30 can be a feature extracting step 35 and the second step can be a feature generating step 70. Generally, the feature extracting step 35 of the present teachings can include the extraction of at least 5 characteristics of the object within the low-resolution imagery from input step 20. These characteristics can then be forwarded to the feature generating step 70. The feature generating step 70 of the present teachings can include the generation of at least 15 features from the characteristics extracted at the feature extracting step 35.

In an exemplary embodiment, each of the images 22, 24, and 26 of the underwater object can be sent to its corresponding feature extraction steps 40, 50, and 60, respectively. Preferably, the feature extraction process at 40, 50, and 60 includes extracting at least 5 characteristics, $x_i(f_n)$, of each of images 22, 24, and 26, wherein x is the characteristic, i ranges from 1-5, and $f_n$ is the frequency. Additionally, at low frequencies, such as at frequency $f_1$, which can correspond to image 22 as shown in FIG. 2, some objects can produce a specular return from the distal side of the underwater object. In such cases, it is preferable to extract four additional characteristics of at least the portion of images 22 that corresponds to the distal side of the underwater object. Thus, when $f_n$ is $f_1$, the i in the formulation $x_i(f_1)$ is from 1-9. Accordingly, the first feature extraction 40, which corresponds to image 22 at frequency $f_1$, can include nine characteristics as shown in FIG. 3.

Figure 3:
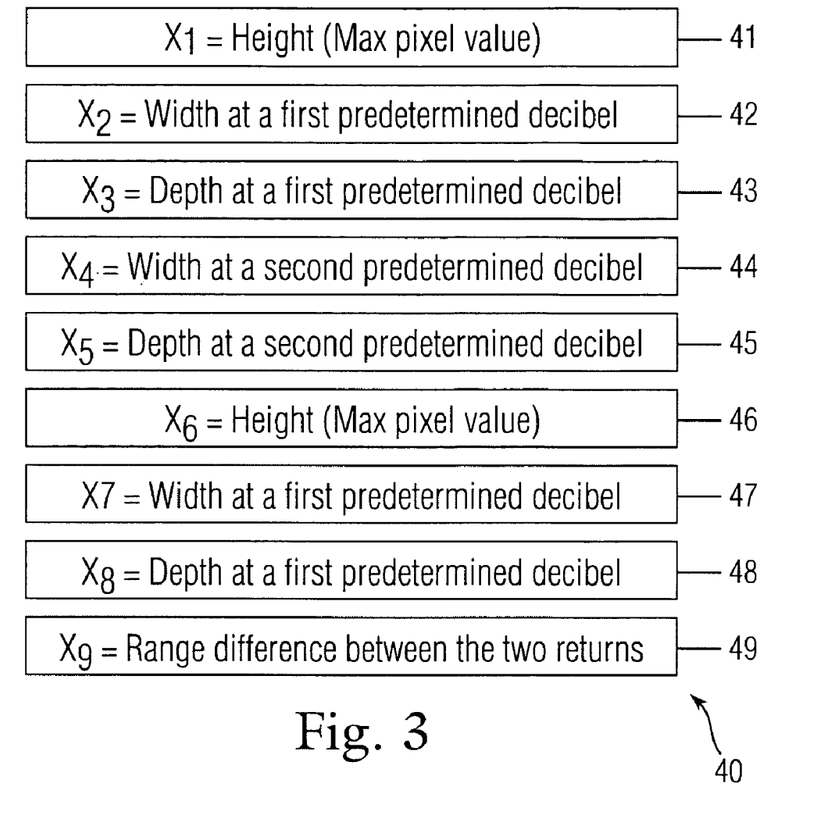
FIG. 3 is a flow diagram showing the process involved in a first feature extraction step of the method according to various embodiments.

According to FIG. 3, the nine characteristics can be: $x_1(f_1)$=height (max pixel value) 41, $x_2(f_1)$=width at a first predetermined dB of height 42, $x_3(f_1)$=depth at a first predetermined dB of height 43, $x_4(f_1)$=width at a second predetermined dB of height 44, $x_5(f_1)$=depth at a second predetermined dB of height 45, $x_6(f_1)$=height (max pixel value) 46, $x_7(f_1)$=width at a first predetermined dB of height 47, $x_8(f_1)$=depth at a first predetermined dB of height 48, and $x_9(f_1)$=range difference between the two returns 49.

Figure 4:
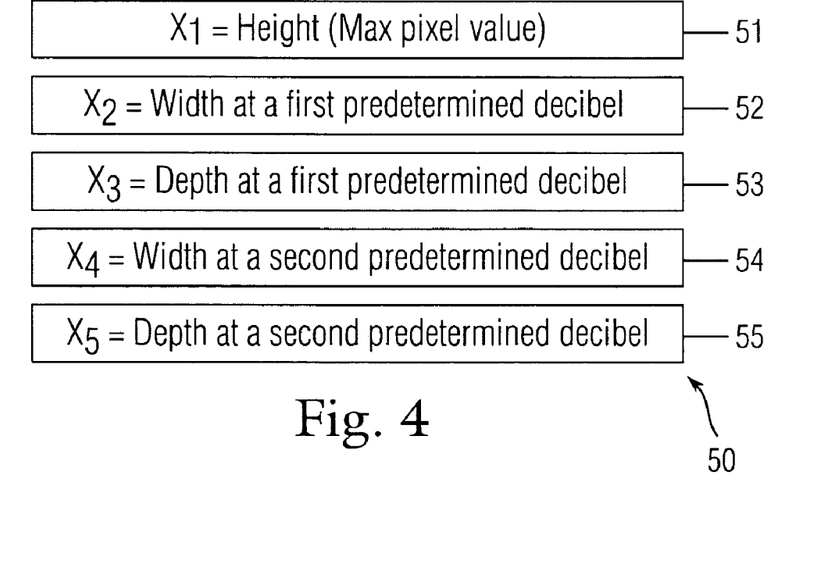
FIG. 4 is a flow diagram showing the process involved in a second feature extraction step of the method according to various embodiments.
Figure 5:
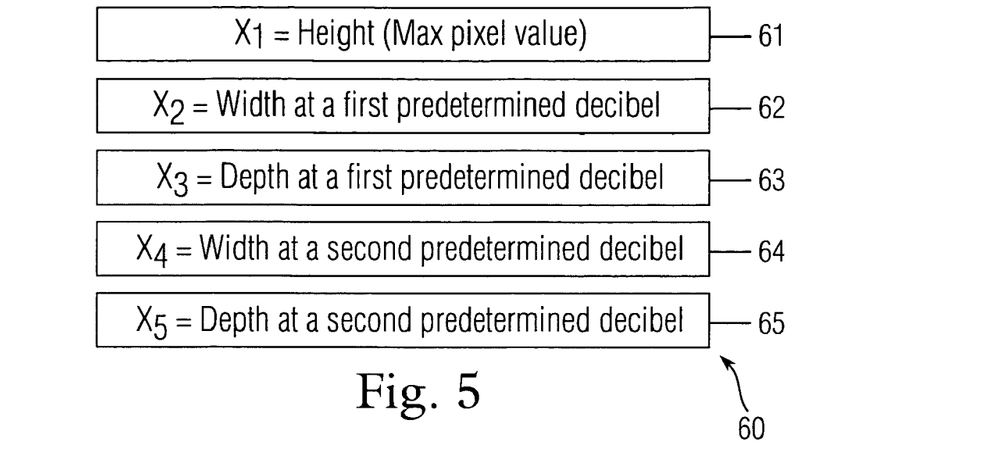
FIG. 5 is a flow diagram showing the process involved in a third feature extraction step of the method according to various embodiments.

In an exemplary embodiment, higher frequencies generally do not produce a specular return from the distal side of the underwater object. Therefore, the second and third feature extractions 50 and 60, which respectively correspond to images 24 and 26 formed at higher frequencies ($f_2$ and $f_3$), can extract 5 characteristics as shown in FIGS. 4 and 5, respectively. According to FIGS. 4 and 5, the 5 characteristics can be: $x_1(f_{2,3})$=height (max pixel value) 51, 61, $x_2(f_{2,3})$=width at a first predetermined dB of height 52, 62, $x_3(f_{2,3})$=depth at a first predetermined dB of height 53, 63, $x_4(f_{2,3})$=width at a second predetermined dB of height 54, 64, and $x_5(f_{2,3})$=depth at a second predetermined dB of height 55, 65.

However, the characteristics extracted at feature extraction step 35 are range dependent. For example, the width of an object in degrees will vary depending on the distance between the sonar and the object. To avoid or minimize errors that can be created due to the extracted characteristics being range dependent, the characteristics can be inputted into the feature generating step 70 of the algorithm stage 30. At the feature generating step 70, the ratios of the at least 5 characteristics that were extracted in feature extraction step 35 can be calculated to generate at least 15 features. These at least 15 features can then be presented to the classifier 80. It is noted that at least 19 features are generated when the feature extraction step 35 provides the feature generating step 70 with 9 characteristics. The 9 characteristics include the four additional characteristics of the image 22 when the underwater object produces a specular return from its distal side.

Figure 6:
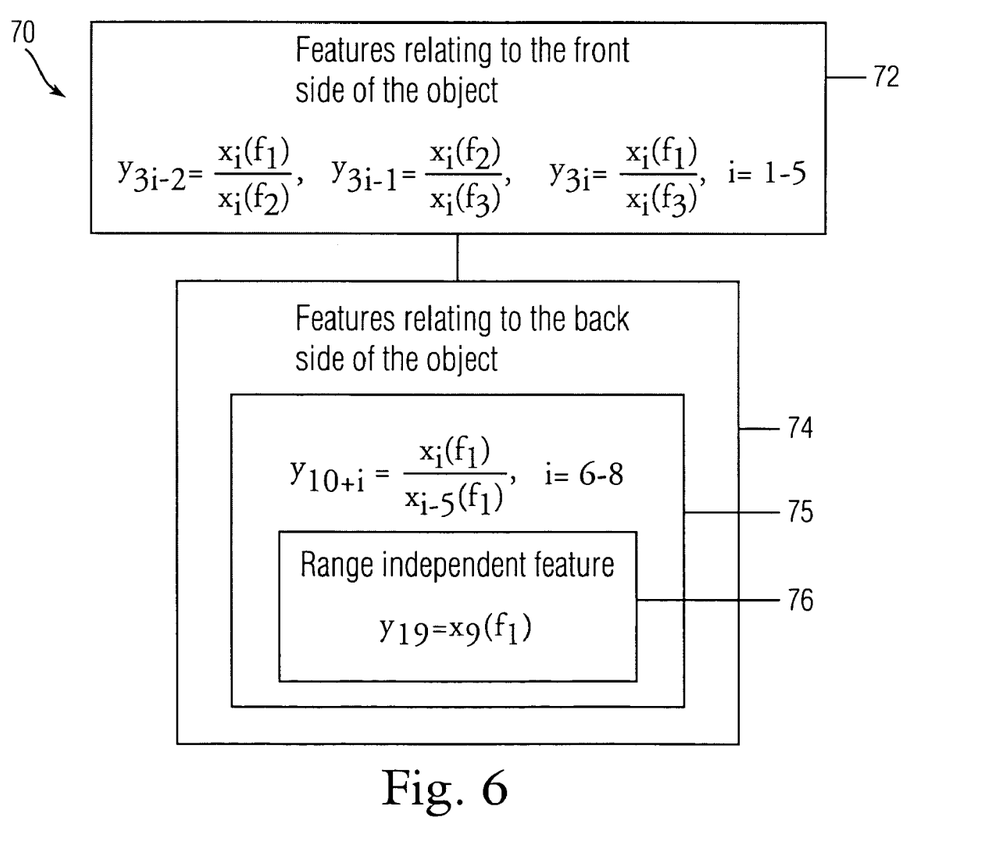
FIG. 6 is a flow diagram showing the process for generating the features of each detected underwater object according to various embodiments.

In an exemplary embodiment as shown in FIG. 6, the feature step 70 can include sub-step 72 and sub-step 74. Generally, the process in sub-step 72 generates features associated with the first 5 characteristics (when no specular return from the distal side of the object exists). Preferably, sub-step 72 generates 15 features ($y_1$-$y_{15}$) from the at least 5 characteristics. The 15 features ($y_1$-$y_{15}$) can be defined by the mathematical formulation:

$$y_{3i-2} = \frac{x_i(f_1)}{x_i(f_2)}, \quad y_{3i-1} = \frac{x_i(f_2)}{x_i(f_3)}, \quad y_{3i} = \frac{x_i(f_1)}{x_i(f_3)},$$

i=1 . . . 5

Generally, the process of sub-step 74 generates features associated with the four additional characteristics of the portion of image 22 corresponding to the distal side of the underwater object. Preferably, the process of sub-step 74 generates features 16-19 ($y_{16}$-$y_{19}$). The process of sub-step 74 can include two sets of algorithms. The first set of algorithms 75 can generate features 16-18 ($y_{16}$-$y_{18}$) and the second set of algorithms 76 can generate features 19 ($y_{19}$). The second set of algorithms 76 is not involved in a ratio computation and is inherently a range-independent feature. In an exemplary embodiment, the first set of algorithms 75 includes the mathematical formulation:

$$y_{10+i} = \frac{x_i(f_1)}{x_{i-5}(f_1)},$$

i=6 . . . 8 and the second algorithms 76 includes the mathematical formulation: $y_{19}=x_9(f_1)$. Once the 19 features are generated, these features are advanced to the classifier 80.

Any known classifier 80 can be used in the present teachings. Some exemplary classifiers include the self-organizing map (SOM) classifier, the multi-layered perceptron (MLP) classifier, and/or the fuzzy classifier. When an SOM classifier is utilized, the SOM takes the N-dimensional input features and projects them onto a 2-dimensional arrangement of output neurons known as the Kohonen layer. The projections in the Kohonen layer are also clustered by the SOM according to the statistical properties of the input features. Preferably, the clustering can be performed in such a way as to preserve the topological order of the input feature space. In an exemplary embodiment, when an input feature is presented to the SOM, a winning neuron is found by determining which Kohonen layer neuron's connection weights most closely match the input feature.

Once the network is trained, the connection weights are frozen and the clusters can then be identified. For this process, an input feature with known class is presented to the network. The winning neuron is found, marked, and the process is repeated for all input features with a known class. For a properly trained network, all input features from one class should occupy the same topological region of the Kohonen layer.

EXAMPLES

Example 1

To evaluate the performance of the algorithm, nine targets were placed on the seafloor (in the surf zone) at a depth of approximately 3 meters. The targets were positioned in a circular pattern and the sonar was placed at the middle of the circle. The position, orientation, and range of the targets and sonar were periodically varied. The nine targets were as follows:

1. Wheelbarrow (orientation #1)
2. Truncated cone (ceramic)
3. Truncated cone (metallic)
4. Sphere (metallic)
5. Tire
6. Wheelbarrow (orientation #2)
7. Circular foam base with PVC pipe protruding from center
8. Cat 'O Nine tails (constructed of rope and wood)
9. Anchor (concrete)

Each target was insonified at the 3 operating frequencies of $f_1$=310 kHz, $f_2$=675 kHz, and $f_3$=900 kHz with multiple (redundant) scans at each frequency. Multiple scans were acquired to validate the robustness of the technique under variable conditions (turbulent surging water disturbing targets and sonar, schools of fish entering the target field, etc.).

Figure 7:
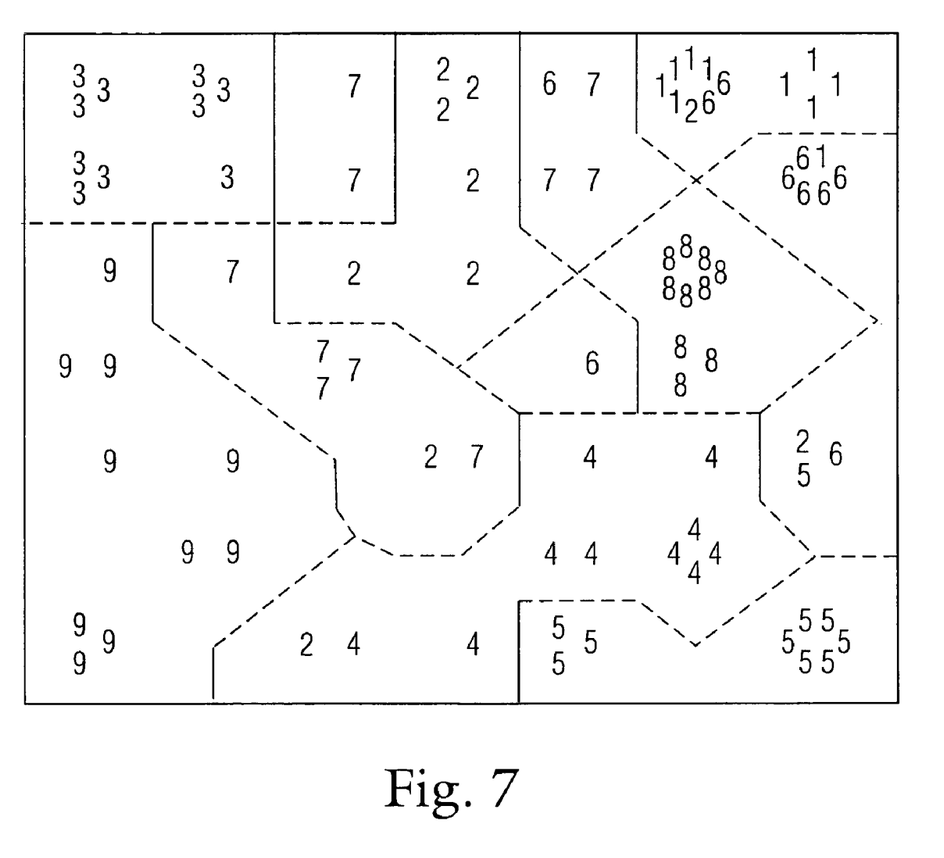
FIG. 7 is a Kohonen layer topology after training on 10 instances of each target.

For one particular instance, 10 images at each of the 3 operating frequencies were acquired. Each of the 10 sets of 3 images was then provided to the feature extraction algorithm and was used to train the self-organizing map. After training, the projected location of each feature vector and its corresponding class was labeled in the Kohonen layer as shown in FIG. 7. According to FIG. 7, the numbers represent the target class and the dashed lines are the decision boundaries that segment the various regions of the Kohonen layer. The decision boundaries are the points, in the Kohonen layer, that are equal distance from the nearest two dissimilar classes (using a Euclidian distance metric). From FIG. 7, it is seen that most of the targets have formed distinct clusters and that similar objects are clustered together (e.g., Target 1 and Target 6 are identical targets at different aspect angles).

Figure 8:
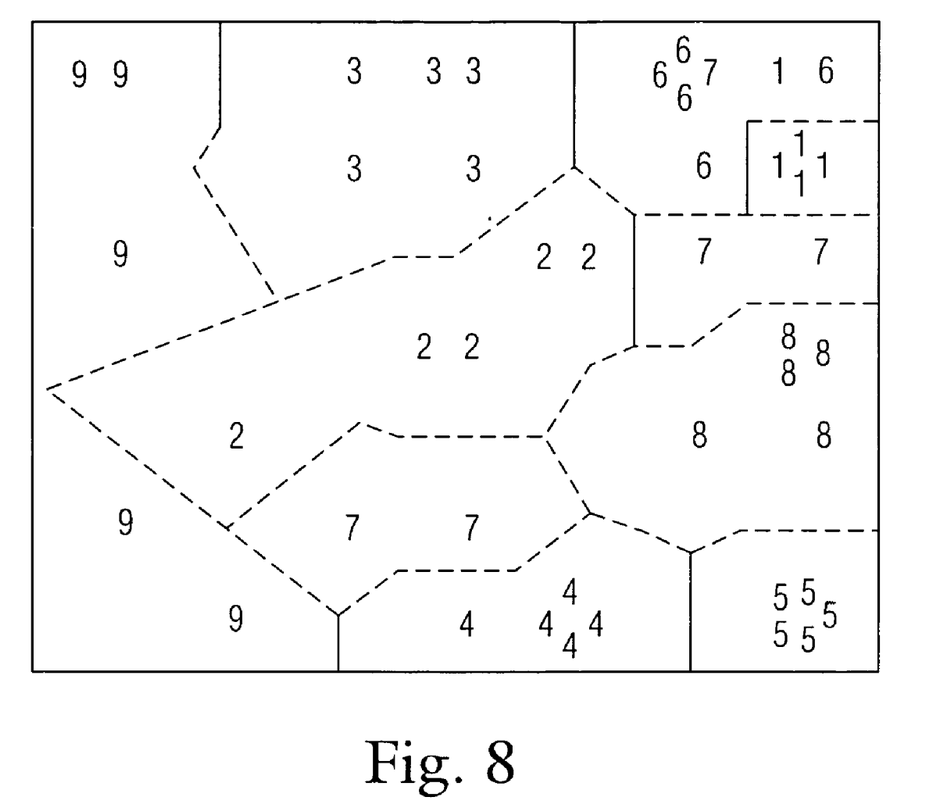
FIG. 8 is a Kohonen layer topology after training on 5 (averaged pair) instances of each target.

In an attempt to further improve clustering, pairs of the 10 raw images were then averaged together. This averaging helped to mitigate noise and spurious information in the images (e.g., turbidity, wave induced target motion, aquatic life, etc.). For the 5 sets of averaged images, the process was repeated and the results are shown in FIG. 8. As shown in FIG. 8, the clustering is improved and many of the isolated, incorrectly located targets from FIG. 7 are now properly clustered. Given that the clustering of data in FIG. 8 is better than the clustering of data in FIG. 7 (which has twice as many training samples) the experiment suggests that the most significant detriment to classifier performance is noise and spurious information in the raw data. From FIGS. 7 and 8, it is concluded that the self-organizing map is able to properly cluster the targets; therefore, there is significant discriminating power in the feature set.

Example 2

The self-organizing map was trained on a set of data and then tested on data from a different instance of the target field. The differences between the two target field instances in the following example include: aspect angle between targets and sonar (in the horizontal plane), the vertical orientation of the sonar (which drastically affects signal return strength), and the presence of new targets that were not present in the test data set.

Figure 9:
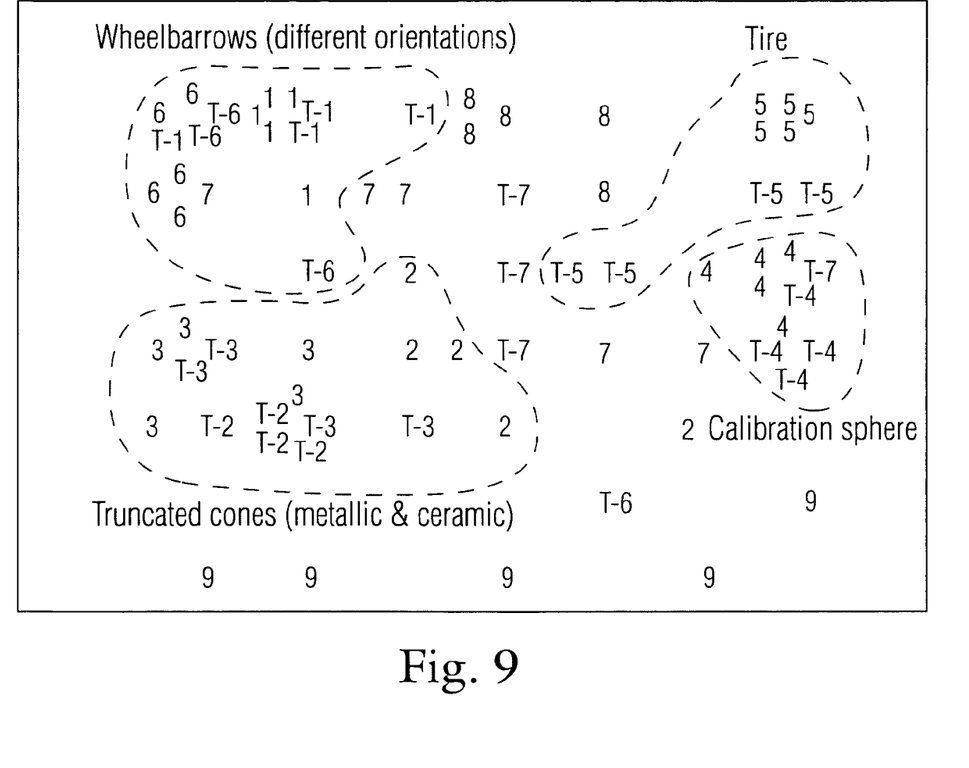
FIG. 9 shows the result of a self-organizing map on one target field instance and tested on a different target field instance.

Results from this experiment are shown in FIG. 9 where the numbers by themselves represent the class of target used for training and the numbers preceded by the letter T represent the class of targets reserved for testing the self-organizing map performance. Additionally, clusters of 4 different target types are indicated by hand-drawn (dashed) lines and labels.

As shown in FIG. 9, the method performs well against the new data. For example, the wheelbarrows (Targets 1 & 6) are still clustering together as are the truncated cones (Targets 2 & 3).

Those skilled in the art can appreciate from the foregoing description that the present invention can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A method of determining a classification of at least one underwater object comprising:
   generating at least one low-resolution imagery of an object from a plurality of frequencies produced by a detection device;
   extracting at least 5 characteristics of the object within the low-resolution imagery at each of the plurality of frequencies;
   generating at least 15 features from the at least 5 characteristics; and
   classifying the features to determine an identity of the at least one underwater object.

2. The method of clam 1, wherein the plurality of frequencies comprises at least three different frequencies.

3. The method of claim 1, wherein the step of extracting the at least 5 characteristics comprises:
   measuring a height of the object within the low-resolution imagery at each of the plurality of frequencies;
   measuring a width of the object within the low-resolution imagery at each of the plurality of frequencies at a first predetermined level of the height;
   measuring a depth of the object within the low-resolution imagery at each of the plurality of frequencies at a first predetermined level of the height;
   measuring a width of the object within the low-resolution imagery at each of the plurality of frequencies at a second predetermined level of the height; and
   measuring a depth of the object within the low-resolution imagery at each of the plurality of frequencies at a second predetermined level of the height.

4. The method of claim 1, wherein each of the generated at least 15 features is calculated according to a mathematical formula:

$$y_{3i-2} = \frac{x_i(f_1)}{x_i(f_2)}, \quad y_{3i-1} = \frac{x_i(f_2)}{x_i(f_3)}, \quad y_{3i} = \frac{x_i(f_1)}{x_i(f_3)},$$

i=1 to 5
wherein $y_1$-$y_{15}$ are the at least 15 features and $x_1$-$x_5$ are the 5 characteristics.

5. The method of claim 1, further comprising the steps of:
extracting at least four additional characteristics of the object within the low-resolution imagery at each of the plurality of frequencies when the at least one object includes a distal side that produces specular returns;
generating at least four additional features from the at least four additional characteristics; and
classifying the four additional features to determine the identity of the at least one underwater object.

6. The method of claim 5, wherein extracting the at least four additional characteristics comprises:
measuring a height of the object within the low-resolution imagery at each of the plurality of frequencies;
measuring the width of the object within the low-resolution imagery at each of the plurality of frequencies at a first predetermined level of the height;
measuring a depth of the object within the low-resolution, imagery at each of the plurality of frequencies at a first predetermined level of the height; and
measuring a range difference between specular returns from the distal side of the underwater object and specular returns from near side of the underwater object.

7. The method of claim 5, wherein each of the at least four additional features is calculated according to the mathematical formulas:

$$y_{10+i} = \frac{x_i(f_1)}{x_{i-5}(f_1)},$$

i=6 to 8 and $y_{19}=x_9(f_1)$, wherein $y_{16}$-$y_{19}$ are the at least four additional features and $x_6$-$x_9$ are the four additional characteristics.

8. The method of claim 1, wherein the step of classifying the features to determine the identity of the at least one underwater object comprises introducing the at least 15 features to a classifier.

9. The method of claim 8, wherein the classifier comprises an MLP classifier, an SOM classifier, a fuzzy classifier, or a combination thereof.

10. A system for determining a classification of at least one underwater object comprising:
a first processor capable of generating at least one low-resolution imagery of an object from a plurality of frequencies produced by a detection device;
a second processor capable of extracting at least 5 characteristics of the object within the low-resolution imagery at each of the plurality of frequencies;
a third processor capable of generating at least 15 features from the at least 5 characteristics, and
a fourth processor capable of classifying the features to determine an identity of the at least one underwater object.

11. The system of claim 10, wherein the third processor is configured to derive the at least 15 features in accordance with a mathematical formula:

$$y_{3i-2} = \frac{x_i(f_1)}{x_i(f_2)}, \quad y_{3i-1} = \frac{x_i(f_2)}{x_i(f_3)}, \quad y_{3i} = \frac{x_i(f_1)}{x_i(f_3)},$$

i=1 to 5, wherein $y_1$-$y_{15}$ are the at least 15 features and $x_1$-$x_5$ are the at least 5 characteristics.

12. The system of claim 10, wherein the second processor is configured to extract at least four additional characteristics of the object within the low-resolution imagery that corresponds to specular returns from a distal side of the at least one underwater object.

13. The system of claim 12, wherein the third processor is configured to generate at least four additional features from the at least four additional characteristics.

14. The system of claim 13, wherein the third processor is configured to derive the at least four additional features in accordance with the mathematical formulas:

$$y_{10+i} = \frac{x_i(f_1)}{x_{i-5}(f_1)},$$

i=6 to 8 and $y_{19}=x_9(f_1)$, wherein $y_{16}$-$y_{19}$ are the at least four additional features and $x_6$-$x_9$ are the four additional characteristics.

15. A method to determine a classification of at least one underwater object comprising:
generating at least one low-resolution imagery of an object from a plurality of frequencies produced by a detection device;
extracting at least 5 characteristics of the object within the low-resolution imagery at each of the plurality of frequencies;
generating at least 15 ratios from the at least 5 characteristics; and
classifying the ratios to determine an identity of the at least one underwater object.

16. The method of claim 15, further comprising the steps of:
extracting at least four additional characteristics of the object within the low-resolution imagery at each of the plurality of frequencies corresponding to specular returns from a distal side of the at least one underwater object;
generating at least four additional ratios from the at least four additional characteristics; and
classifying the features to determine the identity of the at least one underwater object.

* * * * *